ns Patent Office 3,042,491
Patented July 3, 1962

3,042,491
PURIFICATION OF CAUSTIC ALKALI BY ION EXCHANGE
David F. Smith, Newtown, Conn.
(120 Grove St., Bay Head, N.J.)
No Drawing. Filed Oct. 29, 1957, Ser. No. 692,994
9 Claims. (Cl. 23—184)

In my co-pending applications, Serial Nos. 262,339, filed December 18, 1951, now abandoned; 513,590, filed June 6, 1955; 523,942, filed July 22, 1955, now abandoned; 657,002, filed May 6, 1957, now abandoned; and 689,050, filed October 9, 1957; of which this application is a continuation in part, I have disclosed methods of removing anion impurities from strongly alkaline aqueous solutions by contact with anion exchangers of the strong base type. This application discloses further improvements in such methods.

Suitable anion exchangers are described in U.S. Patents Nos. 2,591,573; 2,614,099, and 2,632,001. The reactions involved in my methods may be written $$ROH + NaCl = RCl + NaOH$$
$$ROH + NaClO_3 = RClO_3 + NaOH$$

and $$RCl + NaClO_3 = RClO_3 + NaOH$$

where R is the active cation of the exchanger. Other anions such as sulfate or carbonate may also be so removed from the alkaline solution. After such reactions have taken place and the exchanger has been largely spent, it is necessary to reconvert the exchanger to its original state, or to regenerate it for re-use. This is normally done by washing the exchanger with a solution of soluble hydroxide or chloride of a strong base, such as sodium hydroxide or sodium chloride in order to convert the exchanger to the hydroxyl or to the chloride form, respectively. However, in my co-pending applications I have disclosed the advantages of regenerating the exchanger first with a soluble carbonate or sulfate of a strong base, followed by treatment of the exchanger with a solution of a soluble hydroxide or chloride of a strong base.

For example, when I am removing anion impurities from strong caustic soda solutions I displace the strong caustic from the spent exchanger with dilute sodium carbonate solution or sodium sulfate solution, thus converting the exchanger to the carbonate or the sulfate form (presumably) and then displace the carbonate or sulfate solution from the exchanger directly with the strong caustic solution to be purified. This procedure results in a minimum of regenerating solution required, a minimum of mixed solutions to be discarded or reworked and a minimum of diluted caustic liquors to be reconcentrated. This procedure does not unduly contaminate the purified caustic with carbonate or sulfate since, for example, sodium carbonate and sodium sulfate are only very slightly soluble in, say, 50% aqueous NaOH. However, if the carbonate or sulfate solutions thus used are too strong, there will be an undesirable precipitation of sodium carbonate or sodium sulfate in the column of exchanger. If, however, I use sufficiently dilute carbonate or sulfate solution, I avoid this undesirable precipitation. For example, when I am purifying 50% caustic soda and displacing it from the spent exchanger and regenerating the exchanger with sodium carbonate solution, I find that I get some precipitation when I use 1.0 normal sodium carbonate solution but not when I use 0.5 normal sodium carbonate solution. Similarly I avoid undesirable precipitation when using dilute sodium sulfate solution to regenerate in place of sodium carbonate solution. Another way to avoid such undesirable precipitation of the carbonate or sulfate is to first displace the sodium carbonate solution or the sodium sulfate solution with dilute sodium hydroxide solution before passing the concentrated caustic solution into contact with the column of exchanger. Thus, in purifying 50% aqueous caustic soda by contacting it with an anion exchanger of the strong base type, I regenerate the spent exchanger by displacing the strong caustic from it with either sodium carbonate or sodium sulfate solution dilute enough (usually below 1.0 normal, or preferably 0.5 normal or below) so that excessive precipitation in the exchanger is avoided. I may then displace the regenerating solution directly from the exchanger with the strong caustic to be purified. Alternately, I may displace the carbonate or sulfate solution from the exchanger with dilute caustic solution before introducing to the exchanger the strong caustic to be purified.

Similarly when I am removing chlorate alone (not chloride) from a 50% caustic soda solution of relatively high chloride content (say containing 10 to 20 lbs. NaCl per 1000 lbs. NaOH) by contacting it with an exchanger in the chloride form, I regenerate the spent exchanger with dilute sodium carbonate or sodium sulfate solution of low enough concentration to avoid excessive precipitation of carbonate or sulfate when the regenerating solution is displaced directly with the 50% caustic solution; or in this case also I may first displace the carbonate or sulfate solution from the exchanger with sodium hydroxide solution of relatively low concentration, or I may displace the carbonate or sulfate solution from the exchanger with sodium chloride solution before introducing the strong caustic solution to be purified. Thus I find that the usual practice of regenerating with dilute caustic after treatment of the exchanger with carbonate or sulfate solution is not necessary in my procedure, but I displace the dilute carbonate or sulfate solution from the exchanger directly with the strong caustic solution, or merely use enough dilute caustic to displace the carbonate or sulfate solution sufficiently from the exchanger so as to avoid the precipitation of sodium carbonate or sodium sulfate in the exchanger upon contacting the exchanger with the strong caustic to be purified. This avoids excessive use and accumulation of dilute caustic which must be re-concentrated, re-worked or otherwise used.

As a regenerating solution sodium phosphate can be used in place of the carbonate or sulfate but it is usually more expensive, sodium carbonate usually being the cheapest. In general I may use any soluble carbonate or sulfate that is a strong electrolyte; for example, carbonates or sulfates of any of the alkali metals.

I normally operate my processes in cycles, separating the various solutions as they flow from the column or bed of exchanger; that is, separating the regenerating solution from the mixture of regenerating solution and caustic solution to be purified as it flows through the exchanger displacing the regenerating solution; and separating the purified caustic from the mixture of it and the regenerating solution as the latter flows through the exchanger to displace the purified caustic.

In order to further illustrate my methods, I give the following detailed outline of my procedures. When removing both chloride and chlorate, I normally use about 50% caustic soda (say 40 to 55% NaOH) since removal of chloride is about optimum at such caustic concentration, and I use the most strongly basic exchanger (like Dowex–1, made by the Dow Chemical Company or IRA–400, made by the Rohm and Haas Company) in the form yielded by the carbonate or sulfate regeneration. When the exchanger is spent so that impurities are no longer removed down to the desired level in the strong caustic, I displace the purified caustic from the column of exchanger with sodium carbonate or sodium sulfate solution of concentration less than 1.0 normal, preferably 0.5 normal or weaker sodium carbonate. Most of the strong, pure caustic is thus displaced from the exchanger uncontaminated and undiluted, although there is a narrow zone of caustic diluted with the displacing solution. I continue to pass the said sodium carbonate or sodium sulfate solution through the column or bed of exchanger until the chloride and chlorate ions are largely removed from the exchanger. The regenerating solution is recovered and made up with fresh solution for re-use, a portion of the solution being first discarded. In this manner a large percentage of the carbonate or sulfate solution can be utilized. The said dilute regenerating solution is then displaced from the column of exchanger directly with the approximately 50% caustic soda solution to be purified, and the cycle is repeated. Alternately, the sodium carbonate or sodium sulfate solution may be displaced from the exchanger after the chloride and chlorate have been largely removed from the exchanger into the carbonate or sulfate solution, by a dilute caustic soda solution before the 50% caustic to be purified is passed to the column of exchanger displacing the dilute caustic. But in the latter case I use only enough dilute caustic to displace the excess carbonate or sulfate solution from the exchanger and, if desired, I may use stronger carbonate or sulfate solution after the purified strong caustic is displaced from the exchanger. Such a procedure gives a much higher efficiency in the regeneration than if dilute caustic soda were alone used as regenerant in place of carbonate or sulfate. Any carbonate or sulfate ions on the exchanger are apparently readily removed by the 50% caustic, or at least the exchanger, in the form in which it exists after my procedure, efficiently removes chloride and chlorate from the 50% caustic. A minimum of regenerant is required and a minimum of the 50% caustic is diluted and/or contaminated. Furthermore, there is no troublesome accumulation of precipitate in the exchanger column to clog the bed. Alternatively I may displace the strong, purified caustic from the spent exchanger with dilute caustic before introducing carbonate or sulfate solution, but use only enough for the displacement—and thus regenerate with carbonate or sulfate solution which may in this case be of higher concentration if desired.

In case I wish to remove chlorate but not chloride from about 50% caustic soda (40 to 55% NaOH), and wish to prevent conversion of the exchanger to the less stable hydroxyl form, I use a high chloride caustic containing, say, 10 to 20 lbs. NaCl per 1000 lbs. NaOH. When the exchanger contains so much chlorate as to require regeneration, I displace the so purified 50% caustic from the column of exchanger with sodium carbonate or sodium sulfate solution of concentration below about 1.0 normal—preferably 0.5 normal or less sodium carbonate solution. After the strong purified caustic is displaced, a stronger carbonate or sulfate solution may be used if desired. The carbonate or sulfate solution is passed through the column of exchanger until the chlorate ion is largely removed from the exchanger. The dilute carbonate or sulfate solution is then displaced from the exchanger with the 50% caustic to be purified, the narrow zone of diluted and/or contaminated caustic being separated and the strong caustic flow continued through the column of exchanger until regeneration is again required. Alternatively the carbonate or sulfate solution, after it has largely removed the chlorate from the exchanger, may be displaced by a sodium chloride solution before the strong caustic to be purified is passed into the column of exchanger. In the latter case I may use only enough sodium chloride solution to displace the carbonate or sulfate solution from the exchanger. If partial conversion of the exchanger to the hydroxyl form is not to be avoided, the carbonate or sulfate solution may be displaced from the exchanger with dilute caustic, in which case only enough dilute caustic may be used to effect the said displacement, and also in such case the purified caustic may be displaced from the spent exchanger by dilute caustic followed by the carbonate or sulfate regenerating solution which then may be of higher concentration, if desired. Such procedures again give high regeneration efficiency, minimum dilution and/or contamination of the 50% caustic and no troublesome accumulation of precipitate in the exchanger column.

My procedure then is generally to regenerate the spent exchanger with sodium carbonate or sodium sulfate solution since I obtain much more efficient regeneration than when using caustic soda solution to regenerate the exchanger for removal of chloride and chlorate, or sodium chloride solution to regenerate for removal of chlorate without removing chloride. However, when purifying strong, say 50%, caustic soda from chloride and chlorate, although I may use dilute caustic to displace the 50% caustic from the spent exchanger, I do not use the large quantities of dilute caustic required to largely regenerate the exchanger to the hydroxyl form but use enough sodium carbonate or sodium sulfate solution to largely remove chloride and chlorate ions from the exchanger and then, after such regeneration, although I may use enough dilute caustic to displace the carbonate or sulfate solution from the exchanger, I introduce the 50% caustic directly to the exchanger. If I do not so use dilute caustic for displacement, I must always use about 0.5 normal sodium carbonate or sodium sulfate solution if it is to contact 50% caustic on the exchanger so as to avoid precipitation on the exchanger. Similarly when regenerating exchanger to be used to remove chlorate but not chloride, I regenerate with sodium carbonate or sodium sulfate solution rather than sodium chloride solution and, if the removal of chlorate is from strong, say, 50% caustic, I must avoid precipitation on the exchanger either by using dilute carbonate of sulfate solution (less than 1.0 normal and preferably 0.5 normal or less sodium carbonate) or by using enough dilute caustic soda solution or sodium chloride solution to displace the strong caustic from the spent exchanger before regeneration or to displace the carbonate or sulfate solution from the exchanger after regeneration and before introducing the strong caustic to the regenerated exchanger for purification from chlorate.

As a matter of fact I find it advantageous in regenerating the spent exchanger to use dilute caustic soda solution containing sodium carbonate or sodium sulfate as compared to solution containing sodium hydroxide alone since this mixed solution is much more efficient in removing chloride and/or chlorate ions from the exchanger. Similarly I find that a sodium chloride solution containing sodium carbonate or sodium sulfate is more efficient in removing chlorate ion from the exchanger than is solution containing sodium chloride alone.

It should be pointed out that regeneration by solutions containing carbonate or sulfate is especially advantageous when using the most strongly basic anion exchangers like Dowex–1 or IRA–400, although such regeneration is still advantageous with the slightly less basic exchangers which are inherently less difficult to regenerate (like Dowex–2 made by the Dow Chemical Company or IRA–410 made by the Rohm and Haas Company). Generally in regenerating any strong base type anion exchanger, I find it advantageous to keep the solution alkaline; for example, when using sodium chloride solution for regeneration to the chloride form or solutions containing sodium chloride and sodium sulfate or even sodium chloride and sodium carbonate, I may prefer to add some caustic soda to increase the alkalinity.

It should also be pointed out that when I am removing chlorate and not chloride from an approximately 50% aqueous caustic alkali, particularly caustic soda, regenerating the exchanger with alkali metal (for example, sodium) carbonate, sulfate or phosphate and displace the regenerating solution with alkali metal chloride (particularly sodium chloride) solution, the latter solution must also be so dilute (say less than 10%) as to prevent precipitation of alkali metal chloride (for example, sodium chloride) when the said 50% caustic displaces it from the exchanger. If alkali metal (say sodium) chloride solution alone is used for the regeneration to remove chlorate from the exchanger, this solution must also be so dilute as to prevent precipitation of alkali metal chloride if it is to be directly displaced from the exchanger by the said 50% caustic solution. If the latter solution is substantially saturated with chloride already, the alkali chloride solution must be 1.0 normal or lower in order to prevent such precipitation.

What I claim is:

1. In a process for removing anion impurities selected from the class consisting of chloride and chlorate from strong aqueous caustic alkali having a concentration of from 40 to 55 percent by weight by contact with an anion exchanger of the strong base type containing an anion exchangeable with the anion impurity, the method of regenerating the exchanger for re-use which comprises contacting the exchanger with an aqueous solution of a strongly ionized electrolyte selected from the class consisting of soluble alkali metal carbonates, sulfates and phosphates and displacing the regenerating solution from the exchanger with the strong aqueous caustic alkali to be purified, the said regenerating solution being at a concentration below 1.0 normal so as to substantially avoid precipitation of the electrolyte on the exchanger in contact with the strong aqueous caustic alkali.

2. In a process for removing at least one of the anion impurities selected from the class consisting of chloride, chlorate, carbonate and sulfate from strong aqueous caustic alkali having a concentration of from 40 to 55 percent by weight by contact with an anion exchanger of the strong base type containing an anion exchangeable with the anion impurity, the method of regenerating the exchanger for re-use which comprises contacting the exchanger with an aqueous solution of a strongly ionized electrolyte selected from the class consisting of soluble alkali metal carbonates, sulfates and phosphates and displacing the regenerating solution from the exchanger with the strong aqueous caustic alkali to be purified, the said regenerating solution being at a concentration below 1.0 normal so as to substantially avoid precipitation of the electrolyte on the exchanger in the process.

3. The process for removing from approximately 50% aqueous caustic soda at least one of the impurities selected from the class consisting of chloride and chlorate by contact with an anion exchanger of the strong base type that has been treated with an aqueous solution selected from the class consisting of sodium carbonate, sodium sulfate and sodium phosphate of concentration less than 1.0 normal such that precipitation of the regenerating salt on the exchanger is substantially avoided when the regenerating solution is displaced from the exchanger by the approximately 50% aqueous caustic soda to be purified.

4. The process for removing from approximately 50% aqueous caustic soda at least one of the anion impurities selected from the class consisting of chloride, and chlorate, such process comprising repetitive cycles of operation wherein the following steps are carried out consecutively and the resulting solutions separated as they flow from the exchanger (1) a column of anion exchanger of the strong base type is treated by flowing through it an aqueous solution selected from the class consisting of sodium carbonate, sodium sulfate and sodium phosphate of concentration less than 1.0 normal such that precipitation of the regenerating salt on the exchanger is substantially avoided when the said solution is displaced from the exchanger by the approximately 50% aqueous caustic soda, and the flow of solution is continued through the exchanger until the said anion impurities are largely removed from the exchanger, (2) the approximately 50% aqueous caustic soda to be purified is passed through the column of exchanger to displace the regenerating solution of (1) above and is flowed through the exchanger until the exchanger is spent so that the impurity is no longer removed to the desired degree from the approximately 50% aqueous caustic soda (3) the purified approximately 50% aqueous caustic soda is displaced from the spent exchanger by the regenerating solution of (1) above and the above steps repeated in the order given.

5. The method of regenerating an anion exchanger of the strong base type which comprises treating it with an aqueous solution of a strongly ionized electrolyte selected from the class consisting of soluble alkali carbonates, sulfates, and phosphates in a concentration sufficiently less than 1.0 normal so that precipitation of the electrolyte on the exchanger is substantially avoided when the solution is displaced from the exchanger by a 40 to 55% solution of alkali metal hydroxide, and thereafter displacing the said solution of the strong electrolyte by the said 40 to 55% solution alkali metal hydroxide.

6. The process for removal of at least one anion impurity selected from the class consisting of chloride and chlorate from 40 to 55% aqueous caustic soda by contact with an anion exchanger of the strong base type that has been treated with an aqueous solution of a material selected from the class consisting of sodium carbonate, sodium sulfate and sodium phosphate of a concentration sufficiently less than 1.0 normal so that precipitation of said material on the exchanger is substantially avoided when the said solution is displaced from the exchanger by the said 40 to 55% aqueous caustic soda; so displacing the said solution by flowing through the exchanger the said 40 to 55% aqueous caustic soda and continuing to flow the said 40 to 55% aqueous caustic soda through the exchanger until the exchanger is spent so that it no longer removes the said anion impurity to a pre-determined extent.

7. A process as set forth in claim 1 wherein the concentration of the regenerating solution is below 0.5 normal.

8. A process as set forth in claim 3 wherein the concentration of the regenerating solution is below 0.5 normal.

9. A process as set forth in claim 4 wherein the concentration of the regenerating solution is below 0.5 normal.

References Cited in the file of this patent

UNITED STATES PATENTS

| | | |
|---|---|---|
| 2,157,511 | Urbain | May 9, 1939 |
| 2,366,651 | Rawlings | Jan. 2, 1945 |
| 2,789,036 | Tillman | Apr. 16, 1957 |